(12) United States Patent
Losi

(10) Patent No.: US 10,035,314 B2
(45) Date of Patent: Jul. 31, 2018

(54) PROCESS AND VULCANISING MOULD FOR MANUFACTURING TYRES FOR VEHICLE WHEELS

(71) Applicant: PIRELLI TYRE S.P.A., Milan (IT)

(72) Inventor: Piero Losi, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 329 days.

(21) Appl. No.: 14/781,568

(22) PCT Filed: Mar. 31, 2014

(86) PCT No.: PCT/IB2014/060313
§ 371 (c)(1),
(2) Date: Sep. 30, 2015

(87) PCT Pub. No.: WO2014/167456
PCT Pub. Date: Oct. 16, 2014

(65) Prior Publication Data
US 2016/0039159 A1      Feb. 11, 2016

(30) Foreign Application Priority Data

Apr. 10, 2013   (IT) .............................. MI2013A0566

(51) Int. Cl.
*B29D 30/06*      (2006.01)
*B60C 3/06*      (2006.01)
(Continued)

(52) U.S. Cl.
CPC ..... *B29D 30/0605* (2013.01); *B29D 30/0629* (2013.01); *B29D 30/08* (2013.01); *B60C 3/06* (2013.01); *B29L 2030/003* (2013.01)

(58) Field of Classification Search
CPC ............ B29D 30/0605; B29D 30/0629; B29D 30/08; B60C 3/06
See application file for complete search history.

(56) References Cited

U.S. PATENT DOCUMENTS 3,505,447 A    4/1970  Billes
3,741,696 A    6/1973  Greenwood
(Continued)

FOREIGN PATENT DOCUMENTS

CN         1647958 A     8/2005
CN       101600562 A    12/2009
(Continued)

OTHER PUBLICATIONS

1—International Search Report issued for International Application No. PCT/IB2014/060313 filed on Mar. 31, 2014 in the name of Pirelli Tyre S.P.A.. dated Jul. 7, 2014.
(Continued)

*Primary Examiner* — Mathieu D Vargot
(74) *Attorney, Agent, or Firm* — Steinfl + Bruno LLP

(57) ABSTRACT

A green tire has a symmetric profile in radial section having a radially outer tread band, two radially inner beads and two sidewalls each extended from one edge of the tread band to one of the beads. During a molding and vulcanization treatment of the green tire, a movement is imposed to the tread band with respect to the beads along a direction parallel to a rotation axis of the tire, to obtain a molded and vulcanized tire having an asymmetric profile in radial section. A mold for vulcanizing tires for vehicle wheels is also described, having a tread wall axially asymmetric with respect to a middle line plane of the mold.

15 Claims, 5 Drawing Sheets

(51) Int. Cl.
*B29D 30/08* (2006.01)
*B29L 30/00* (2006.01)

(56) References Cited

U.S. PATENT DOCUMENTS

| | | |
|---|---|---|
| 7,316,255 B2 | 1/2008 | Nakagawa |
| 2003/0034132 A1 | 2/2003 | De Graaf et al. |
| 2003/0143294 A1 | 7/2003 | Fike |
| 2003/0155057 A1 | 8/2003 | Hubbell, Jr. et al. |
| 2010/0096070 A1 | 4/2010 | Mancini et al. |
| 2011/0088832 A1 | 4/2011 | Marchini et al. |
| 2014/0147539 A1 | 5/2014 | Jeannoutot et al. |

FOREIGN PATENT DOCUMENTS

| | | |
|---|---|---|
| CN | 102046362 A | 5/2011 |
| CN | 102202877 A | 9/2011 |
| DE | 1173238 B | 7/1964 |
| EP | 0 755 808 A2 | 1/1997 |
| EP | 1207059 A2 | 5/2002 |
| EP | 1 627 717 A1 | 2/2006 |
| EP | 2671729 A1 | 12/2013 |
| FR | 1 440 604 A | 6/1966 |
| FR | 2 966 075 A1 | 4/2014 |
| JP | 2009126424 | 6/2009 |
| RU | 1243280 A1 | 2/1993 |
| RU | 2131355 C1 | 6/1999 |
| WO | 2010/049960 A1 | 5/2010 |
| WO | 2012052299 A1 | 4/2012 |

OTHER PUBLICATIONS

2—International Search Report issued for International Application No. PCT/IB2014/060313 filed on Mar. 31, 2014 in the name of Pirelli Tyre S.P.A.. dated Jul. 7, 2014.

3—Search Report issued for Italian Patent Application No. MI20130566 filed on Apr. 10, 2013 in the name of Pirelli Tyre S.P.A. Completion date: Oct. 30, 2013.

4—Written Opinion issued for Italian Patent Application No. MI20130566 filed on Apr. 10, 2013 in the name of Pirelli Tyre S.P.A. Completion date: Oct. 30, 2013.

First Office Action for Chinese Patent Application No. 201480041201.4.2 filed on behalf of Pirelli Tyre S.P.A. dated Dec. 29, 2016. 23 pages (Chinese original + English translation).

First Office Action for Chinese Patent Application No. 201480019903.2 filed on behalf of Pirelli Tyre S.P.A. dated Sep. 19, 2016. Chinese original + English translation. 25 pages.

Office Action for Russian Patent Application No. 2015146284/05(071248) filed on behalf of Pirelli Tyre S.P.A. dated Mar. 6, 2018. 9 pages (Russian original + English translation).

Search report for Russian Patent Application No. 2015146284/05(071248) filed on behalf of Pirelli Tyre S.P.A. dated Mar. 6, 2018. 4 pages (Russian original + English translation).

Second Office Action for Chinese Patent Application No. 201480041201.4.2 filed on behalf of Pirelli Tyre S.P.A. dated Sep. 26, 2017. 10 pages (Chinese original + English translation).

Written Opinion issued for International Application No. PCT/IB2014/060313 filed on Mar. 31, 2014 in the name of Pirelli Tyre S.P.A.. dated Jul. 7, 2014. 5 pages.

PROCESS AND VULCANISING MOULD FOR MANUFACTURING TYRES FOR VEHICLE WHEELS

CROSS REFERENCE TO RELATED APPLICATIONS

The present application is the U.S. national stage entry of International Patent Application No. PCT/IB2014/060313, filed internationally on Mar. 31, 2014 which, in turn, claims priority to Italian Patent Application No. MI2013A000566, filed on Apr. 10, 2013.

The present invention has as object a process for manufacturing tyres for vehicle wheels.

A further aspect of the invention relates to a vulcanising mould for tyres, adapted to actuate the aforesaid process.

Preferably, the present invention refers to road tyres of UHP (Ultra High Performance) type and to competition tyres that equip automobiles capable of high drive performances with straight line speeds that can even exceed 300 Km/h.

A tyre for motor vehicle wheels generally comprises a carcass structure associated with a belt structure. In radially outer position with respect to the belt structure, a tread band is arranged. The tread is the portion of the tyre which comes into direct contact with the road surface and exchanges therewith the forces that allow driving the automobile along the trajectories set by the driver.

By camber angle it is intended the angle complementary to the angle formed between the rotation axis of the wheel and the axis perpendicular to the ground passing through the rotation centre of the hub. Such angle is conventionally negative if the wheel is tilted towards the automobile or, in other words, if the lower part of the tyre, which touches the ground, is further away from the automobile with respect to the upper tyre part.

By middle line plane "$P_T$" of the tyre, it is intended the plane orthogonal to the rotation axis of the tyre and axially equidistant from the axially outer ends of the beads of the tyre.

By "beads" of the tyre, it is intended the radially inner zones thereof, at which the engagement occurs between the tyre and a respective mounting rim. Each bead normally integrates an anchoring annular structure comprising at least one reinforcement annular insert, usually termed bead core, bearing a filler in radially outer position. The filler, normally made of elastomeric material, has a base portion joined to the bead core and being tapered in moving away from the rotation axis of the tyre, until reaching a radially outer apex. In particular, each zone identified as "bead" is comprised between one of the radially inner edges of the tyre and the radially outer apex of the respective filler.

By middle line plane "$P_W$" of the wheel, it is intended the plane orthogonal to the rotation axis of the wheel and axially equidistant from the axially inner ends of the two housings for the beads (rim edges) of the rim on which the tyre is mounted.

When the tyre is mounted on the rim, the two planes must coincide ($P_T$=$P_W$).

It is observed that by axial terminal portions of the tread band (which with non-deformed tyre define two circumferences corresponding to the circumferential edges of the tread band), it is intended in this context the axial end points of the tyre that touch the road surface when the tyre in operating conditions, not collapsed (mounted on a rim and inflated to the operating pressure) and with camber angle equal to 0° is overloaded with a load equal to about double the nominal load.

By middle circumferential line of the tread band, it is intended the set of points of the tread band (which with non-deformed tyre define a circumference) equidistant from the two terminal axial ends of the tread band itself.

By medium line of the tread band it is intended that line that, in a radial section of the tyre, joins together the two axial terminal portions of the tread band.

The document EP 0 755 808 illustrates a tyre comprising a carcass structure, which is extended around the tyre from bead to bead, two sidewalls and a tread zone. When the tyre is mounted on a rim and inflated to a predetermined pressure, the tread zone is asymmetric and has the point of maximum diameter of the tyre moved in the axial direction, with respect to the central line of the section of the tyre, towards the inner sidewall. The radial distance from the point of maximum diameter of the outer sidewall is greater than the radial distance from the point of maximum diameter of the inner sidewall, in a manner such that the tread zone has an asymmetric profile.

The document JP2009126424 illustrates a tyre having a first tread provided with a low resistance to rolling, a second tread provided with a high "grip" and a third tread. With small camber angles, the first tread rests on the ground while the second and third tread are separated from the road surface. With high camber angles, the second and third tread come into contact with the road surface.

US 2003/0155057 relates to a mould having an asymmetric tread contour. At one of the opposite sides with respect to the median central line of the crown of a conventional mould, material is removed in order to obtain a shape having the desired movement of the point of maximum diameter of the tread band.

The Applicant has observed that the tyres are often mounted on the automobiles with a camber angle in order to optimize the behaviour of the automobile.

More precisely the Applicant has observed that during the running of the automobile on a straight line, the geometry with non-zero camber angle produces, in tyres having symmetric profile, a footprint with a non-uniform pressure distribution. For example, a negative camber angle produces, during the rectilinear advancing of the motor vehicle, a footprint that is asymmetric with respect to a plane perpendicular to the ground containing the advancing direction and passing through the rotation centre of the hub, and such to move the point of application of the resulting force due to the contact pressures between the tyre and the road surface towards the inner sidewall (motor vehicle side) of the tyre. The Applicant deems that such effect is mainly due to the fact that the medium line of the tread band is not parallel to the road support surface but is tilted. It follows that, with each revolution of the wheel, the inner portion (motor vehicle side) of the footprint is pressed and deformed more than the outer portion, and this implies a non-uniform wear of the tyre in the tread (greater wear towards the inner portion), not regular over time and a non-optimal behaviour, due to the inefficiency of the pressure distribution, which also negatively affects the behaviour on a bend.

In such field, the Applicant has set the objective of improving the performances of tyres. In particular, the Applicant has perceived the need to propose a tyre for vehicle wheels which ensure a more uniform wear of the tread in operating conditions, more regular over time and which allows preventing the performance levels of the tyre from excessively deteriorate during the useful lifetime thereof.

In particular, the Applicant has perceived the importance of ensuring the most uniform pressure distribution possible on the footprint of the tyre, both during straight line travel and while travelling on a curve.

The Applicant has also perceived that, by mounting a tyre with an asymmetric profile in radial section (a radial section contains the rotation axis of the tyre) and with predefined camber angle preferably substantially zero on the automobile, it is possible to obtain the effect of an equivalent non-zero camber angle during the travel on a curve and the effect similar to that of a symmetric tyre with camber angle substantially equal to zero during straight line travel.

The Applicant has also observed that a building process obtaining an asymmetric green tyre in radial section in its profile should be avoided in order to maintain high operating flexibility and high productivity in the existing plants.

The Applicant has finally found that by building a tyre having a symmetric profile in radial section and imposing a relative axial movement between the tread band and the beads simultaneously with the execution of the operations of moulding and vulcanisation of the tyre, it is possible to permanently consolidate the structure of the tyre according to an asymmetric configuration in its profile in radial section suitable for conferring the desired behaviour characteristics to the tyre itself.

More specifically, according to a first aspect, the present invention relates to a process for manufacturing tyres for vehicle wheels, comprising: building a green tyre having a symmetric profile in radial section, having a radially outer tread band, two radially inner beads and two sidewalls each being extended from one edge of the tread band to one of the beads; and moulding and vulcanising the green tyre.

Preferably, during said moulding and vulcanisation, it is also provided to impose a movement to the tread band with respect to the beads along a direction parallel to a rotation axis of the tyre, in a manner so as to obtain a moulded and vulcanised tyre having an asymmetric profile in radial section.

In accordance with a second aspect, the present invention relates to a vulcanising mould for tyres for vehicle wheels, comprising a moulding cavity having a plurality of sectors configured for operating against the tread band, two bead seats configured for operating against the beads of the tyre, and two sidewall plates each extending between said plurality of sectors and one of the bead seats.

Preferably said plurality of sectors in its entirety defines a tread wall whose geometric conformation is a copy of that of the tread band of the moulded and vulcanised tyre.

Preferably said tread wall is axially asymmetric with respect to a middle line plane of the mould, axially equidistant from axially outer edges of the bead seats.

The Applicant deems that the relative movement between the tread band and the beads imposed during moulding and vulcanisation makes it possible to attain, in the finished tyre, a non-alignment between the middle circumferential line of the tread band and the middle line plane "$P_W$" of the wheel.

The Applicant also deems that the non-alignment between the middle circumferential line of the tread band and the middle line plane "$P_W$" of the wheel allow mounting the wheel on the automobile with a camber angle preferably substantially zero, obtaining:

on a curve, an effect equivalent to the presence of a camber angle;

on a straight line, that the variation of the length of the footprint (measured in the advancing sense of the vehicle) along the axial direction (orthogonal to the advancing sense of the vehicle) is more limited and the distribution of the pressures results more uniform than that of a tyre with symmetric profile in radial section mounted with an optimal non-zero camber angle in relation to that vehicle model.

According to the Applicant, the desired non-alignment between the middle circumferential line of the tread band and the middle line plane of the wheel is advantageously attainable even if the green tyre is built in accordance with a structure and/or configuration that is perfectly symmetric. Therefore, tyres with asymmetric profile in radial section in accordance with the present invention can be advantageously obtained without it being necessary to predispose particular expedients during the building of the green tyre.

The obtainment of the asymmetry of the profile in radial section of the tyre thus does not require the installation of particular additional equipment along the building lines of the tyre, facilitating the simplification of the processes and the operative flexibility of the plants. Also eliminated is the need to introduce additional and/or modified components in the structure of the tyre.

The present invention, in at least one of the aforesaid aspects, can also have one or more of the preferred characteristics that are described hereinbelow.

It can be provided to introduce the green tyre in a moulding cavity wherein the green tyre, before being introduced in the moulding cavity, is preferably symmetric with respect to an its own middle line plane orthogonal to the rotation axis of the tyre.

It can be provided to close the green tyre in a moulding cavity, wherein said green tyre, closed in the moulding cavity, is symmetric with respect to an its own middle line plane orthogonal to the rotation axis of the tyre.

It is therefore possible to use conventional building lines and processes, without it being necessary to alter the productive processes of any semifinished product. This circumstance also leads to an improved productive flexibility of the plants. Indeed, one same building line can be employed for producing symmetric and asymmetric tyres.

Preferably during vulcanisation, the tread band, moved axially with respect to the beads, is retained in accordance with an axially asymmetric position with respect to a middle line plane of the tyre.

The retention of the tread band, together with the belt structure possibly coupled thereto and the underlying carcass ply/plies, during the entire vulcanisation treatment or a sufficient part thereof, permanently stabilizes the structure of the tyre according to the desired asymmetric configuration. More particularly, during vulcanisation a middle circumferential line of the tread band is moved axially by a predefined distance with respect to a middle line plane of the tyre.

Preferably the movement of the tread band is for example actuated simultaneously with a closure action of the green tyre inside a moulding cavity.

The tyre closed in the moulding cavity can therefore already be precisely set according to the desired asymmetric conformation, consolidated following the successive vulcanisation treatment.

The tyre is preferably vulcanised in a moulding cavity having a plurality of sectors operating against the tread band, two bead seats operating against the beads of the tyre, and two sidewall plates each extending between said plurality of sectors and one of the bead seats.

The invention can therefore be actuated without introducing extensive modifications in the equipment normally employed for the moulding and vulcanisation of conventional tyres.

Preferably said plurality of sectors is maintained spaced-apart from the tread band during the movement of the tread band with respect to the beads.

Therefore, one eliminates the risk that the tread band mechanically interferes against the sectors and is retained by them during the action of movement with respect to the beads.

Preferably the movement of the tread band with respect to the beads is carried out in the absence of mechanical interferences between said plurality of sectors and the tread band.

Undesired structural distortions of the tyre are thus prevented, as these are unwanted and hard to control.

It can be provided to fix the positioning of the tread band inside the mould during the movement of the tread band with respect to the beads.

Preferably said fixing action is executed by a gripping action exerted by a plurality of sectors against the tread band.

Preferably the green tyre is closed in the moulding cavity by:

axially approaching the bead seats against the respective beads of the tyre;

centripetally approaching at least a part of said plurality of sectors, in order to come into contact with the tread band of the tyre.

Preferably the movement of the tread band with respect to the beads is actuated simultaneously with the action of axially approaching the bead seats.

Preferably the green tyre is closed in the moulding cavity by:

axially approaching the sidewall plates against the respective sidewalls of the tyre;

centripetally approaching at least a part of said plurality of sectors, in order to come into contact with the tread band of the tyre.

Preferably the movement of the tread band with respect to the beads is actuated simultaneously with the action of axially approaching the sidewall plates.

Preferably the movement of the tread band is at least partially actuated simultaneously with an action of pressing of the green tyre against inner surfaces of the moulding cavity.

Thus, the asymmetry of the tyre can be attained or increased, before the completion of the vulcanisation treatment. In addition, the at least partial entrusting of the movement to the intervention of the pressing action allows, if necessary, generating or accentuating desired tensioning effects in some components of the tyre, in order to attain determinate behaviour characteristics.

Preferably each bead seat preferably has a radially inner surface and an axially outer surface respectively converging towards an axially outer edge of the bead seat.

Preferably, said plurality of sectors in its entirety defines a tread wall whose geometric conformation is a copy of that of the tread band of the vulcanised tyre.

Preferably said tread wall is axially asymmetric with respect to a middle line plane of the moulding cavity, axially equidistant from axially outer edges of the bead seats.

Preferably said tread wall has a middle circumferential line that is axially offset at a predefined distance with respect to a middle line plane of the moulding cavity axially equidistant from axially outer edges of the bead seats.

Preferably said tread wall has a middle circumferential line that is axially offset at a predefined distance with respect to a middle line plane of the moulding cavity axially equidistant from radially inner edges of the sidewall plates.

Preferably axial terminal portions of said tread wall are radially equidistant from a geometric axis of the moulding cavity.

A greater uniformity of the distribution of the ground contact pressures is therefore ensured, benefiting performances and wear regularity of the tyre in operating condition.

Preferably, the following are provided for:

axial movement devices for axially arranging said bead seats adjacent to each other;

radial movement devices for centripetally moving at least a part of said plurality of sectors.

Preferably the radial movement devices are configured for centripetally moving the sectors after the axial movement devices have axially arranged said bead seats adjacent to each other.

Preferably the radial movement devices are configured for centripetally moving the sectors before the axial movement devices have completed the adjacent axial arrangement of said bead seats.

Preferably the following are provided for:

axial movement devices for axially arranging two sidewall plates adjacent to each other;

radial movement devices for centripetally moving at least a part of said plurality of sectors.

Preferably the radial movement devices are configured for centripetally moving the sectors after the axial movement devices have axially arranged the sidewall plates adjacent to each other.

Preferably the radial movement devices are configured for centripetally moving the sectors before the axial movement devices have completed the adjacent axial arrangement of the sidewall plates.

Preferably each bead seat has a radially inner surface and an axially outer surface respectively converging towards an axially outer edge of the bead seat.

Preferably said tread wall has a middle circumferential line, axially equidistant from axially opposite edges of said tread wall and axially offset at a predefined distance with respect to a middle line plane of the mould, axially equidistant from the axially outer edges of the bead seats.

Preferably axial terminal portions of said tread wall are radially equidistant from the rotation axis of the tyre.

Further characteristics and advantages will be clearer from the detailed description of a preferred but not exclusive embodiment of a process and a vulcanising mould for manufacturing tyres for motor vehicle wheels in accordance with the present invention.

Such description will be set forth hereinbelow with reference to the set of drawings, provided only for exemplifying and hence non-limiting purposes, in which.

Figure 4:
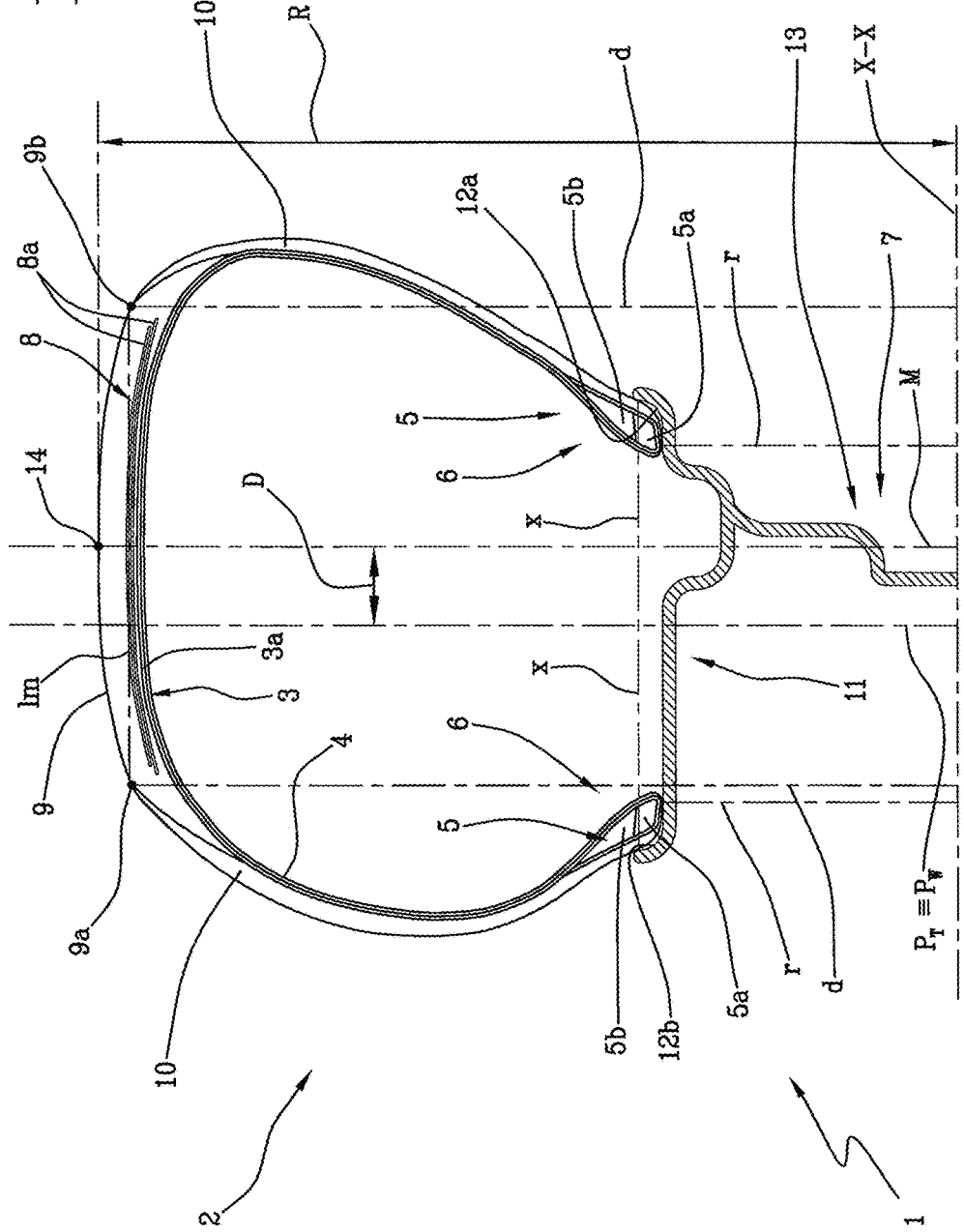
FIG. 4 shows a partial radial section of a wheel for motor vehicles obtained in accordance with the present invention.
Figure 5:
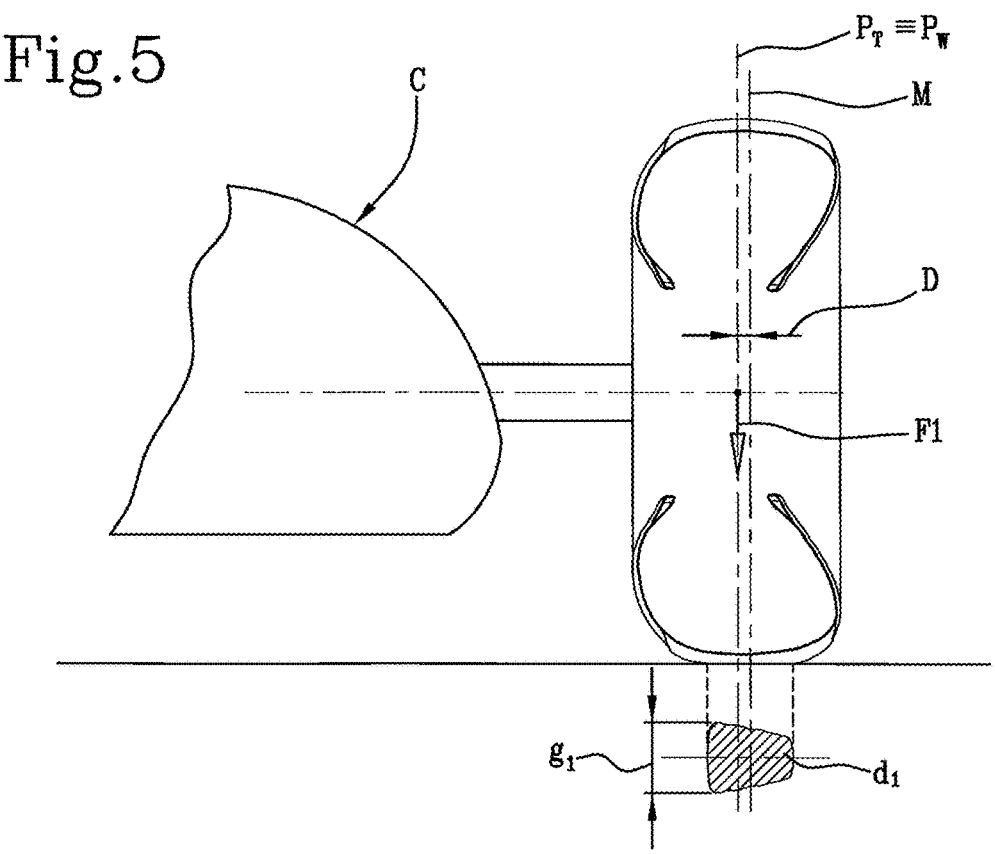
Figure 6:
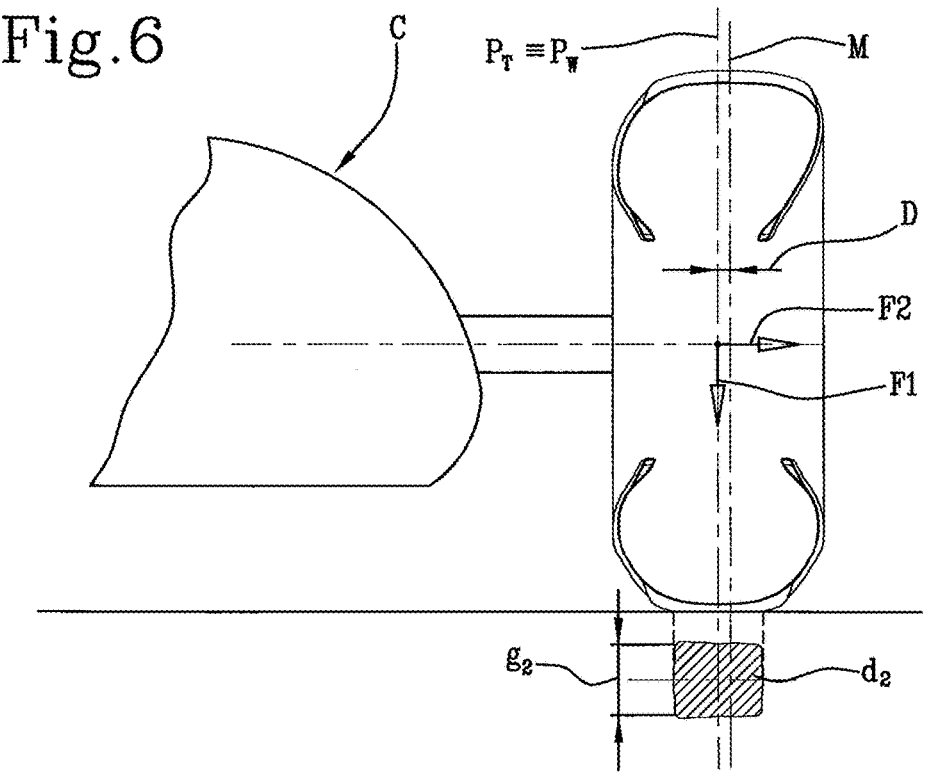

FIGS. 5 and 6 schematically shows a motor vehicle provided with the wheel of FIG. 4 in respective operating conditions and with the ground footprints.

With particular reference to FIGS. 4 to 6, reference number 1 overall indicates a wheel for motor vehicles comprising a tyre 2.

The tyre 2 has a carcass structure 3 which comprises at least one carcass ply 3a preferably internally covered by a layer of impermeable elastomeric material or so-called liner 4. Two anchoring annular structures 5—each comprising a reinforcement annular insert or so-called bead core 5a preferably bearing an elastomeric filler 5b in radially outer position with respect to the bead core itself—are engaged with respective end flaps of the carcass ply/plies 3a. The filler 5b has a radially outer apex, being tapered in moving away from the bead core 5a. The anchoring annular structures 5 are integrated in proximity to zones normally identified with the name "beads" 6, at which the engagement between the tyre 2 and a respective mounting rim 7 normally occurs, according to a fitting diameter determined by the inner diameter size of the anchoring annular structures 5. Each bead 6 is extended from one radially inner edge of the tyre to the radially outer apex of the filler 5b.

A crown structure 8 normally comprising one or more belt layers 8a is circumferentially applied around the carcass ply/plies 3a, and a tread band 9 is circumferentially superimposed on the belt layers 8a. Two sidewalls 10, each being extended from the corresponding bead 6 to a corresponding lateral edge of the tread band 9, are applied in laterally opposite positions on the carcass ply/plies 3a.

The rim 7, per se known, has a substantially cylindrical body 11 provided with a radially outer channel, where the tyre 2 is placed. The substantially cylindrical body 11 delimits an axially outer housing 12a—i.e. directed towards the exterior of a motor vehicle when the rim is mounted on said motor vehicle—and an axially inner housing 12b—i.e. directed towards the motor vehicle side when the rim is mounted on said motor vehicle, defined by respective radially outer annular slots symmetric with respect to a middle line plane "$P_W$" orthogonal to a rotation axis "X-X" of the wheel 1 (here substantially coinciding with the rotation axis of the tyre 2 and indicated in the same manner. The axially outer housing 12a and the axially inner housing 12b are each adapted to receive a respective bead 6 of the tyre 1.

The rim 7 also comprises a radially inner body 13, with respect to the substantially cylindrical body 11, in which devices are obtained (not illustrated and for example defined by holes and relative bolts) for coupling the wheel 1 to the hub. In the illustrated embodiment, the radially inner body 13 is non-aligned with respect to the middle line plane "$P_W$" and moved towards the axially outer housing 12a of the rim 7 in a manner so as to form the necessary space inside the substantially cylindrical body 11 for the placement of the hub and the braking devices (e.g. brake discs and callipers).

The geometry of the rim 7, in particular with reference to the radially inner body 13 adapted to receive the hub, is such to render two housings unambiguously identified: axially outer housing 12a and axially inner housing 12b.

The radial distance "r" of each of the two axially outer/inner housings respectively 12a, 12b, from the rotation axis "X-X", measure along a diameter of the rim 7, is the same. The axial distance "x" measured parallel to the rotation axis "X-X", of each of the two axially outer/inner housings respectively 12a, 12b from the middle line plane "$P_W$", is the same.

The two beads 6 of the tyre 1, each installed in a respective axially outer/inner housing 12a, 12b are also symmetric with respect to the middle line plane "$P_W$" (or "$P_T$"). The radial distance "r" of each of the two beads 6 from the rotation axis "X-X", measured along a diameter of the rim 7, is the same. The axial distance "x" of each of the two beads 6 measured parallel to the rotation axis "X-X" from the middle line plane "$P_W$" (or "$P_T$") is the same.

When the tyre 2 is not mounted on the rim and when it is mounted on the rim, inflated to the operating pressure but not subjected to external stress forces, said tyre 2 has a non-symmetric geometry in a radial section (FIG. 4).

In particular—excluding the beads 6—the carcass structure 3, the belt structure 8, the tread band 9 and the sidewalls 10 of the tyre 2 are asymmetric with respect to the middle line plane "$P_W$" (or "$P_T$"). The tread band 9 is translated, with respect to a symmetric conventional tyre, along an axial direction towards the axially outer housing 12a of the rim 7.

In a radial section (FIG. 4), the two opposite axial ends 9a and 9b of the tread band 9 have the same radial distance "d", measured along a diameter of the wheel 1, from the rotation axis "X-X". In other words, the medium line "Im" of the tread band 9 is parallel to said rotation axis "X-X". The tread band 9 has middle circumferential line 14 thereof (constituted by the points equidistant from the two opposite axial ends 9a and 9b) moved, with respect to the middle line plane "$P_W$" (or "$P_T$"), by a predefined distance "D". As is visible in FIG. 4, in the illustrated embodiment, the tread band 9 is also symmetric with respect to a plane of symmetry "M". In other words, the middle circumferential line 14 lies on the plane of symmetry "M" which is orthogonal to the rotation axis "X-X" and is moved, with respect to the middle line plane "$P_W$" (or "$P_T$"), by the predefined distance "D".

The wheel 1 is mounted on the automobile "C" with a predefined camber angle and the middle circumferential line 14 (or plane of symmetry "M") thereof moved, with respect to the middle line plane "$P_W$" (or "$P_T$"), towards the exterior of the automobile "C" itself.

Preferably said camber angle is substantially zero.

With vehicle stopped during straight line travel (FIG. 5), even if the tyre 2 is subjected to centrifugal forces, which increase the diameter thereof, and to ground interaction forces, the tread band 9 maintains its non-alignment with respect to the middle line plane "$P_W$" (or "$P_T$") also at the portion directly set on the ground; this is due to the non-alignment of the middle circumferential line with respect to the middle line plane "$P_W$" (or "$P_T$"), in which the vertical force transmitted by the hub acts. In such operating condition, the footprint "$d_1$" is also non-aligned with respect to the line of intersection between the ground and the middle line plane "$P_W$" (or "$P_T$"), in which the vertical force "$F_1$" lies which is transmitted from the hub. Due to such asymmetry, the length "$g_1$" of the ground footprint "$d_1$" is slightly greater towards the inner sidewall (towards the automobile "C") of the tyre 2 than towards the outer sidewall. Such asymmetry is in any case less than the asymmetry of the footprint of a wheel with negative camber angle, optimal for a corresponding tyre with symmetric cross section. Such asymmetry is less because it lacks the contribution given (in tyres with symmetric profile with negative camber angle) by the greater crushing of the inner sidewall (motor vehicle side) with respect to the outer sidewall due to the tilt (equal to the camber angle) of the medium line of the tread band with respect to the ground.

While the automobile follows a curve (FIG. 6), each tyre that is external with respect to the curve (on which most of the centripetal force that acts on that axis of the automobile is unloaded) is deformed and the footprint assumes a configuration that decreases the initial asymmetry (with respect to the middle line plane $P_W$) characteristic of the straight line travel with non-zero camber angle.

More particularly, the force "$F_2$" which passes from the hub to the wheel 1 tends to move the rim 7 towards the exterior while the tyre portion 2 which adheres to the ground remains adherent thereto. It follows that the tyre 2 is deformed at the portion directly set on the ground and those immediately adjacent portions. The tread band portion 9 in contact with the ground reduces or cancels its non-alignment with respect to the middle line plane "$P_W$" (or "$P_T$") (the plane of symmetry "M" and the middle line plane "$P_W$" (or "$P_T$") approach each other until they are possibly superimposed) while the diametrically-opposite tread band portion 9 maintains the abovementioned predefined distance "D". Due to such deformation, the length "$g_2$" of the footprint "$d_2$" is substantially constant along the entire axial extension of the footprint "$d_2$" itself.

In accordance with the present invention, a process for obtaining a tyre according to that described above provides for building a green tyre 2, having a symmetric profile in radial section, with the tread band 9 in radially outer position, the two beads 6 in radially inner position and the two sidewalls 10 each being extended from one edge of the tread band 9 to one of the beads 6. The building of the green tyre 2 can be executed in any manner, even per se known and conventional, and therefore it is not described in detail herein.

Figure 1:
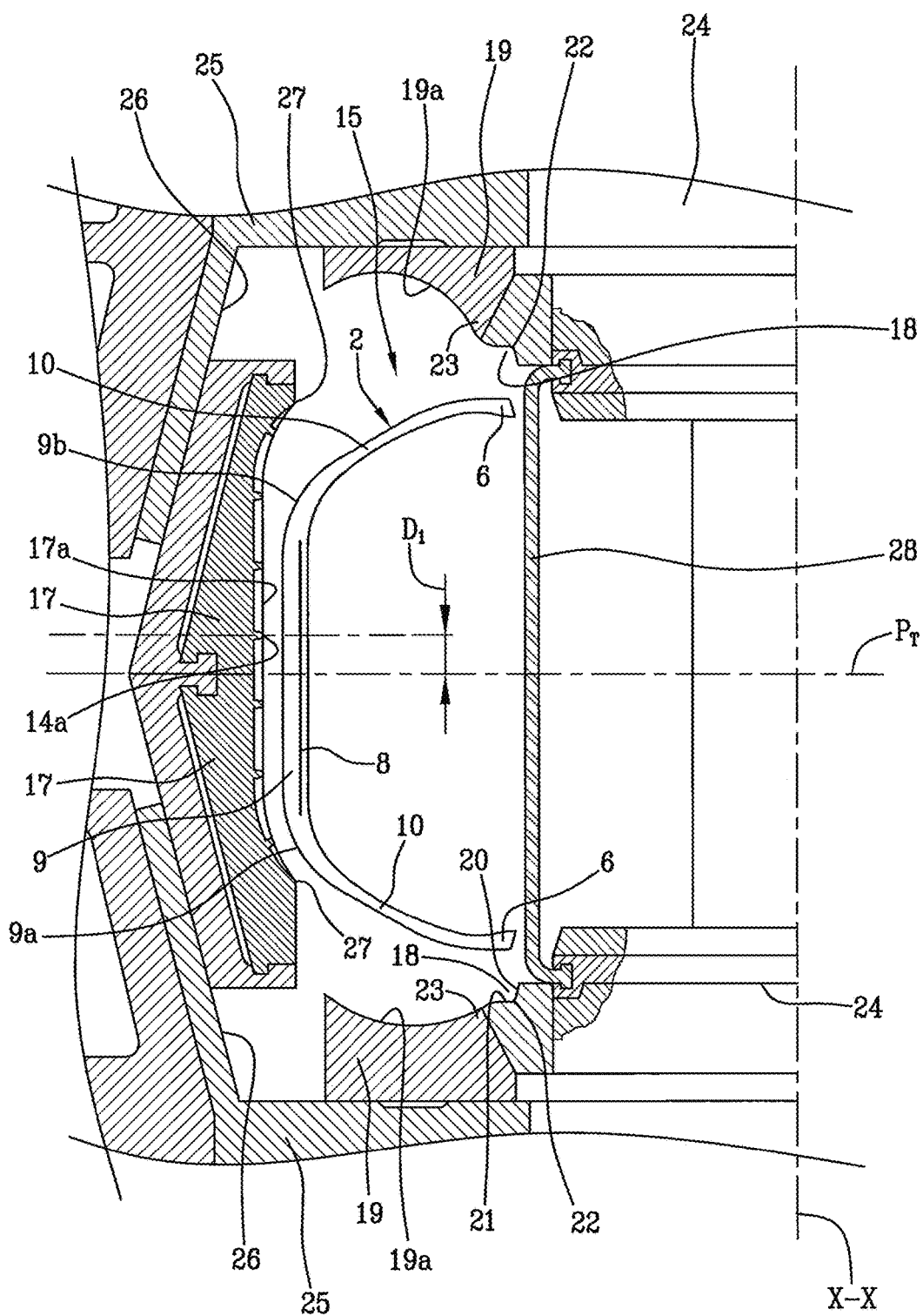
FIG. 1 shows, in partial radial section, a built green tyre, introduced into a vulcanising mould predisposed in open condition, in accordance with the present invention.
Figure 2:
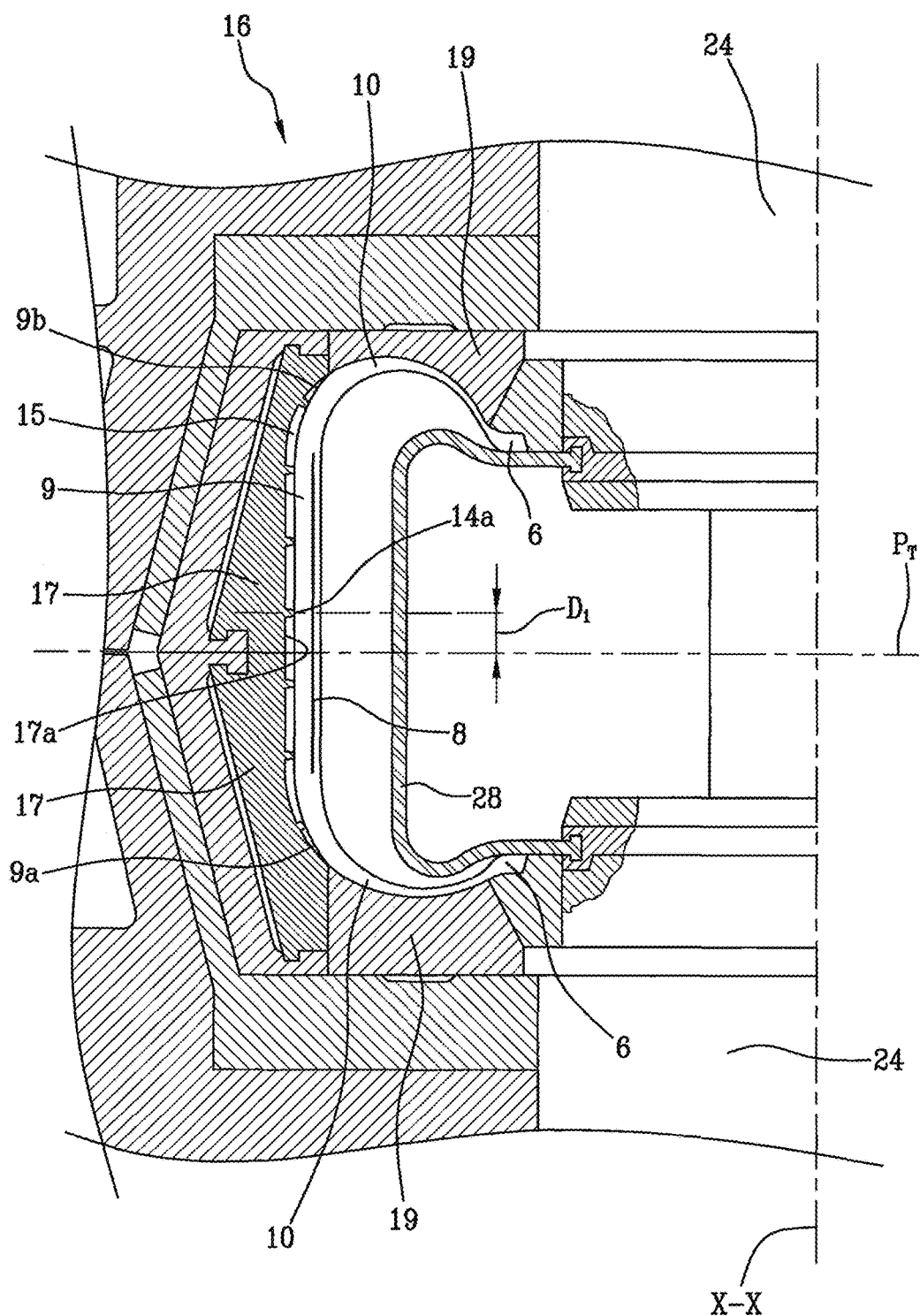
FIG. 2 shows the tyre of FIG. 1 in a closed condition of the mould.
Figure 3:
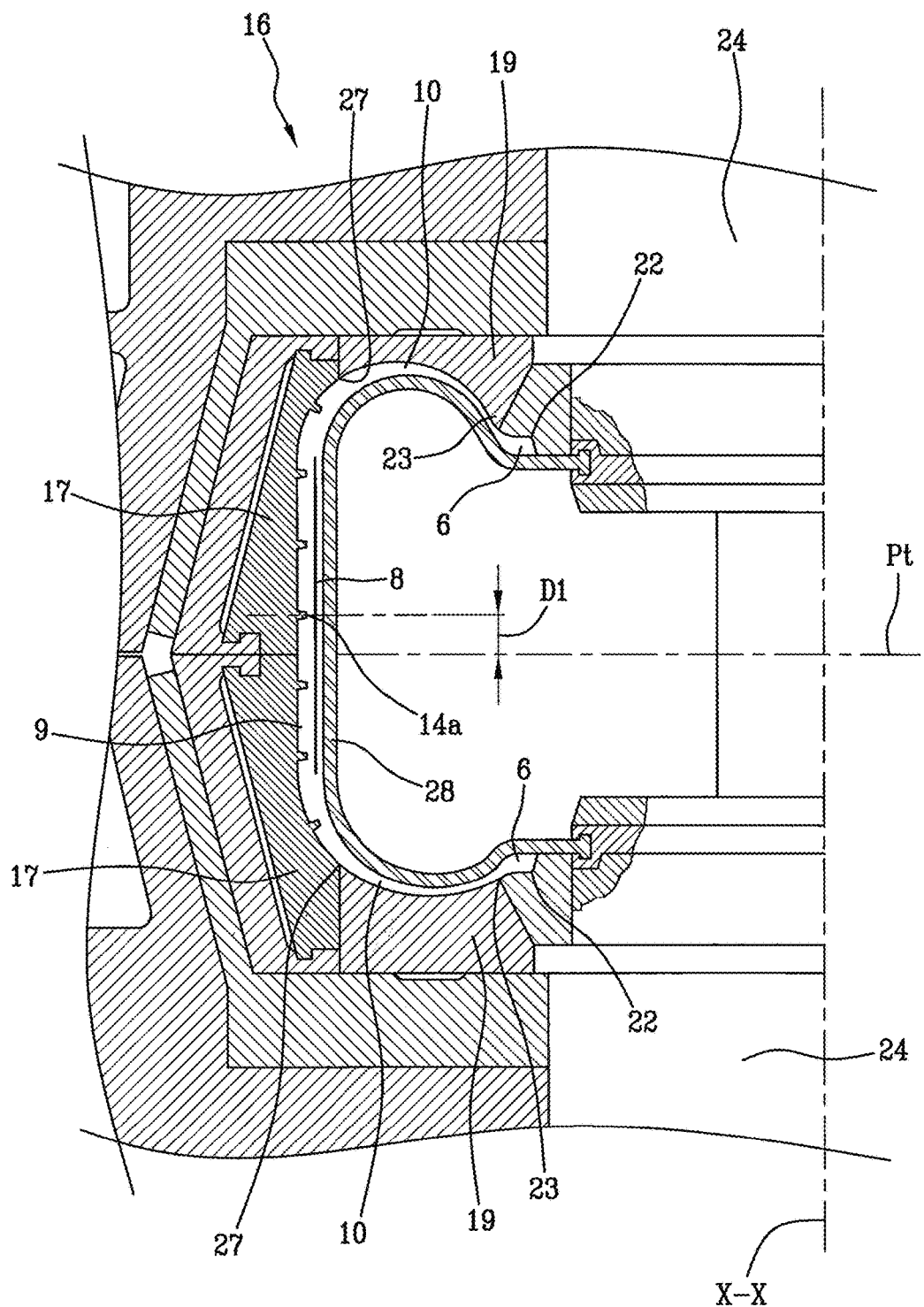
FIG. 3 shows the tyre during an action of pressing an action of pressing of the green tyre closed in the mould.

The built green tyre 2 is introduced into a moulding cavity 15 of a vulcanisation mould 16, illustrated in FIGS. 1 to 3, in order to be subjected to a moulding and vulcanisation treatment. The moulding cavity 15 has a plurality of sectors 17 configured for operating against the tread band 9 of the tyre 2, two bead seats 18 configured for operating against the beads 6, and two sidewall plates 19 each being extended between said plurality of sectors 17 and one of the bead seats 18, in order to operate against the sidewalls 10 of the tyre 2.

Each of the bead seats 18 has a radially inner surface 20 and axially outer surface 21, respectively converging towards an axially outer edge 22 of the bead seat 18. In the illustrated example, each of the bead seats 18 is defined by an annular element operatively couplable to one of the sidewall plates 19, for example against a radially inner edge 23 of the latter. In a possible modified embodiment, the bead seats 18 can be obtained directly in one piece in the sidewall plates 19.

The plurality of sectors 17 in its entirety defines a tread wall 17a whose geometric conformation is a copy, in negative, of that of the tread band 9 of the vulcanised tyre.

The sidewall plates 19 define respective sidewall walls 19a which, with closed mould, are extended from respective axially opposite edges 27 of the tread wall 17a to the respective bead seats 18.

The mould 16 also comprises axial movement devices, for example represented by two columns 24 of which at least one is axially movable with respect to the other, for axially arranging the bead seats 18 and/or the sidewall plates 19 respectively fixed thereto adjacent to each other.

Radial movement devices provide to centripetally move the plurality of sectors 17 or at least a part thereof. For example, the movement devices, can comprise a pair of half-shells 25 respectively carried by the columns 24, and internally having tilted guide surfaces 26 cooperating with the sectors 17 so as to determine a mutually approaching or moving-apart radial movement thereof, simultaneously with the mutual axial approaching and moving-apart motion of the columns 24.

In a further embodiment, not illustrated since it can also be obtained in a known manner, the radial movement devices can be configured for centripetally moving the sectors 17 after the axial movement devices have axially arranged the bead seats 18 and/or the sidewall plates 19 adjacent to each other.

The movement of the bead seats 18, sidewall plates 19 and/or sectors 17 occurs between an open condition, in which the columns 24 and the parts borne thereby are mutually moved apart in order to allow the introduction of the green tyre 2 and the extraction of the moulded and vulcanised tyre 2, and a closure condition in which the sectors 17, the sidewall plates 19 and the bead seats 18 delimit contours of the moulding cavity 15, as in FIGS. 2 and 3.

FIG. 1 represents an intermediate condition in which the columns 24 have been partially approached until a mutual mating has been determined of the sectors 17 respectively borne by one half-shell 25 and the other.

As is clearly illustrated in FIG. 1, the built green tyre 2, before reaching the closure condition, and in any case before being introduced into the moulding cavity 15, is symmetric with respect to the middle line plane "$P_T$" thereof.

More particularly, the beads 6, the carcass structure 3, the belt structure 8, the tread band 9 and the sidewalls 10 of the green tyre 2 are symmetric with respect to the middle line plane "$P_T$".

In a radial section (FIG. 1), the two opposite axial ends 9a and 9b of the tread band 9 have the same axial distance from the middle line plane "$P_T$". The opposite axial ends 9a and 9b of the tread band 9 also have the same radial distance "d", measured radially from the rotation axis "X-X". In other words, the medium line "Im" of the tread band 9 is parallel to said rotation axis "X-X".

The middle circumferential line 14 of the tread band 9 coincides with the middle line plane "$P_T$", with respect to which the entire tread band 9 is symmetric.

In accordance with the present invention, during the moulding and vulcanisation treatment of the tyre 2 in the moulding cavity 15, a movement is imposed to the tread band 9 with respect to the beads 6, along a direction parallel to the rotation axis of the tyre 2, in a manner such that the moulded and vulcanised tyre have an asymmetric profile in radial section, as previously described.

For such purpose, it is preferably provided that the tread wall 17a defined by the plurality of sectors 17, in its entirety, is axially asymmetric with respect to a middle line plane of the mould 16, axially equidistant from axially outer edges 22 of the bead seats 18 and/or from radially inner edges 23 of the sidewall plates 19, and hence coinciding with the middle line plane "$P_T$" of the tyre 2 closed in the mould itself.

More particularly, the tread wall 17a has a middle circumferential line 14a, axially equidistant from the axially opposite edges 27 of said plurality of sectors 17 in its entirety, axially offset at a predefined displacement distance "$D_1$" with respect to the middle line plane of the mould 16. Such displacement distance "$D_1$" can be equal to or different from, for example greater than, the predefined distance "D" detectable on the vulcanised tyre 2, mounted on the rim 7 in operating conditions.

Axial terminal portions of the plurality of sectors 17 in its entirety, bearing the aforesaid axially opposite edges 27, are radially equidistant from a geometric axis of the moulding cavity 15, preferably coinciding with the rotation axis X-X of the tyre 2 closed in the moulding cavity itself. The position of the axial terminal portions coincides with the position of the two opposite axial ends 9a and 9b of the tread band 9 in the vulcanised tyre 2, and/or causes the orientation of the aforesaid medium line "Im" in operating condition.

The movement of the tread band 9 with respect to the beads 6 can be partially or totally obtained simultaneously with the closure of the green tyre 2 inside the moulding cavity 15.

More particularly, during the mutual approaching of the columns 24 and of the half-shells 25, it may be provided that the sidewall plates 19 and/or the bead seats 18 come into contact against the sidewalls 10 and/or the beads 6 of the tyre 2. An axial deformation is therefore imposed on the tyre 2, in the section comprised between the beads 6 and the respective opposite axial ends 9a, 9b of the tread band 9, the axial deformation such to determine the axial movement of the tread band 9 with respect to the beads 6, simultaneously with mutual axial approaching of the sidewall plates 19 and/or of the bead seats 18.

During such deformation, the sectors 17 can remain spaced from the surfaces of the tread band 9, such that the movement of the tread band 9 with respect to the beads 6 is executed in the absence of mechanical interferences between the plurality of sectors 17 and the tread band 9 themselves.

During the approaching of the sidewall plates 19 and/or the bead seats 18, a progressive centripetal approaching of the sectors 17 can in any case be actuated, until they come into contact with the tread band 9 upon completion of the closure of the mould 16.

The configuration of the mould 16, for example obtained by arranging a suitable tilt of the guide surfaces 26, can nevertheless be suitable for determining a contact between sectors 17 and tread band 9 before the start or the conclusion of the movement of the tread band 9 and/or before the completion of the closure of the mould 16. In this situation, the sectors 17 are adapted to carry out a gripping action on the tread band 9 which fixes the positioning thereof inside the mould 16 during the lateral deformation that determines the movement of the tread band 9 with respect to the beads 6.

Once the closure of the mould 16 has been completed, an action of vulcanisation of the tyre 2 is conducted, simultaneously with an action of pressing of the same against the inner surfaces of the moulding cavity 15. For example, for such purpose it can be provided to use an expandable chamber 28 inside the tyre 2, in which vapour or another pressurised fluid for determining the action of pressing and the administration of heat is introduced.

The action of the expandable chamber 28 can increase or, in a possible modified embodiment of the invention, determine the movement of the tread band 9 with respect to the beads 6, simultaneously with pressing. In a possible modified embodiment of the invention the movement of the tread band 9 with respect to the beads 6 can be mainly or exclusively attained simultaneously with the action of pressing, rather than due to the closure of the mould 16.

During vulcanisation or at least part thereof, the tread band 9, moved axially with respect to the beads 6, is retained in accordance with an axially asymmetric position with respect to a middle line plane "$P_T$" of the tyre 2, with the middle circumferential line 14 thereof moved axially according to the predefined distance of displacement "$D_1$" with respect to the middle line plane of the moulding cavity 15 and the tyre 2.

The molecular cross-linking induced in the elastomeric material due to the vulcanisation permanently stabilizes the structure of the tyre 2 according to the desired asymmetric configuration.

The invention claimed is:

1. A process for manufacturing tyres for vehicle wheels, comprising:

building a green tyre having a symmetric profile in radial section, having a radially outer tread band, two radially inner beads and two sidewalls each being extended from one edge of the tread band to one of the beads;
moulding and vulcanising the green tyre; and
during moulding, imposing a movement to the tread band with respect to the beads along a direction parallel to a rotation axis of the tyre,
wherein, during moulding, imposing a movement to the tread band causes the tread band to be axially offset with respect to the beads and with respect to a middle line plane of the tyre,
wherein, during vulcanisation, the offset of the tread band with respect to the beads is retained with respect to the middle line plane of the tyre,
wherein, during vulcanisation, a middle circumferential line of the tread band is axially offset by a predefined distance with respect to the middle line plane of the tyre, and
wherein a moulded and vulcanised tyre having an asymmetric profile in radial section is obtained.

2. The process as claimed in claim 1, also comprising introducing the green tyre in a moulding cavity, wherein the green tyre, before being introduced in the moulding cavity, is symmetric with respect to its own middle line plane orthogonal to the rotation axis of the tyre.

3. The process as claimed in claim 1, also comprising closing the green tyre in a moulding cavity, wherein said green tyre, closed in the moulding cavity, is symmetric with respect to its own middle line plane orthogonal to the rotation axis of the tyre.

4. The process as claimed in claim 1, wherein the movement of the tread band is actuated simultaneously with a closure action of the green tyre inside a moulding cavity.

5. The process as claimed in claim 1, wherein the tyre is vulcanised in a moulding cavity having a plurality of sectors operating against the tread band, two bead seats operating against the beads of the tyre, and two sidewall plates each extending between said plurality of sectors and one of the bead seats.

6. The process as claimed in claim 5, wherein said plurality of sectors is maintained spaced apart from the tread band during the movement of the tread band with respect to the beads.

7. The process as claimed in claim 5, wherein the movement of the tread band with respect to the beads is carried out in absence of mechanical interferences between said plurality of sectors and the tread band.

8. The process as claimed in claim 1, also comprising fixing the positioning of the tread band inside the mould during the movement of the tread band with respect to the beads.

9. The process as claimed in claim 8, wherein said fixing action is carried out by a gripping action exerted by a plurality of sectors against the tread band.

10. The process as claimed in claim 5, wherein the green tyre is closed in the moulding cavity by:
axially approaching the bead seats against the respective beads of the tyre; and
centripetally approaching at least a part of said plurality of sectors, in order to come into contact with the tread band of the tyre.

11. The process as claimed in claim 10, wherein the movement of the tread band with respect to the beads is actuated simultaneously with the action of axially approaching the bead seats.

12. The process as claimed in claim 5, wherein the green tyre is closed in the moulding cavity by:
   axially approaching the sidewall plates against the respective sidewalls of the tyre; and
   centripetally approaching at least a part of said plurality of sectors, in order to come into contact with the tread band of the tyre.

13. The process as claimed in claim 12, wherein the movement of the tread band with respect to the beads is actuated simultaneously with the action of axially approaching the sidewall plates.

14. The process as claimed in claim 1, wherein the movement of the tread band is at least partially actuated simultaneously with an action of pressing the green tyre against inner surfaces of the moulding cavity.

15. The process as claimed in claim 5, wherein said plurality of sectors in its entirety defines a tread wall whose tread wall geometric conformation is a copy of a tread band geometric conformation of the vulcanised tyre.

\* \* \* \* \*